Aug. 19, 1958 H. A. BLOOD 2,847,724
WINDOW CONSTRUCTION
Filed Jan. 21, 1953 4 Sheets-Sheet 1

INVENTOR.
Harold A. Blood
BY Reginald W. Hoagland
ATTORNEY

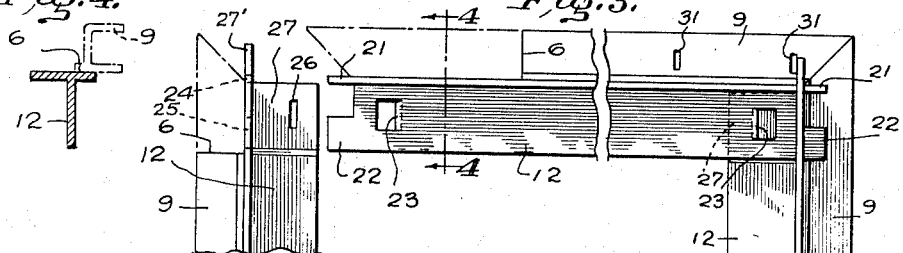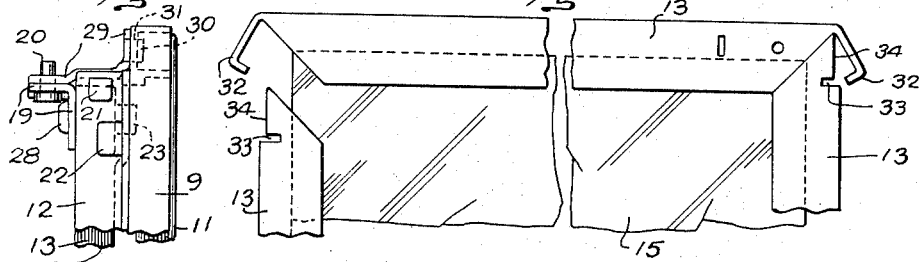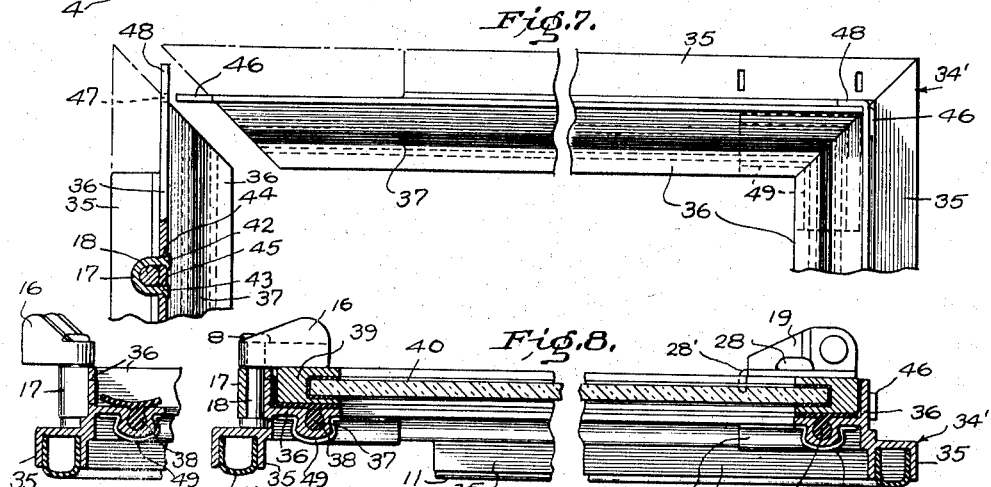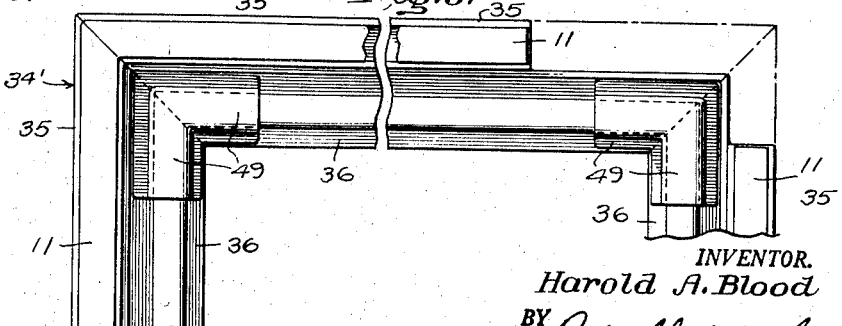

Aug. 19, 1958  H. A. BLOOD  2,847,724
WINDOW CONSTRUCTION
Filed Jan. 21, 1953  4 Sheets-Sheet 3
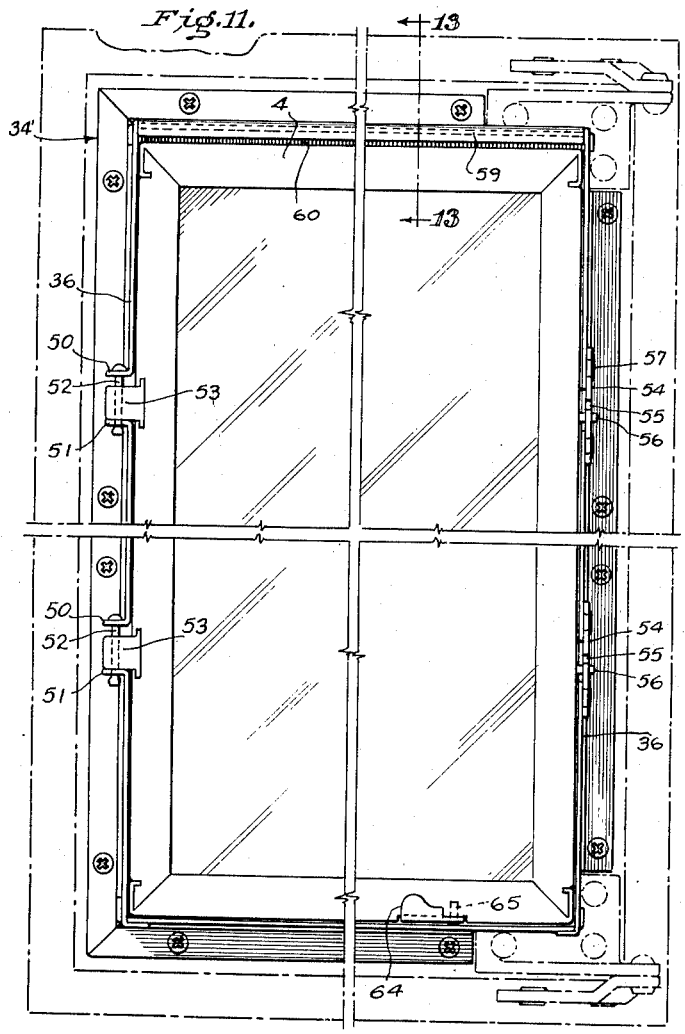
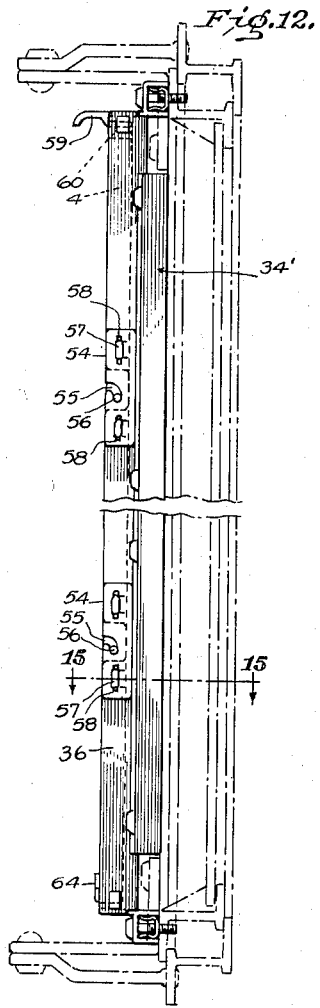
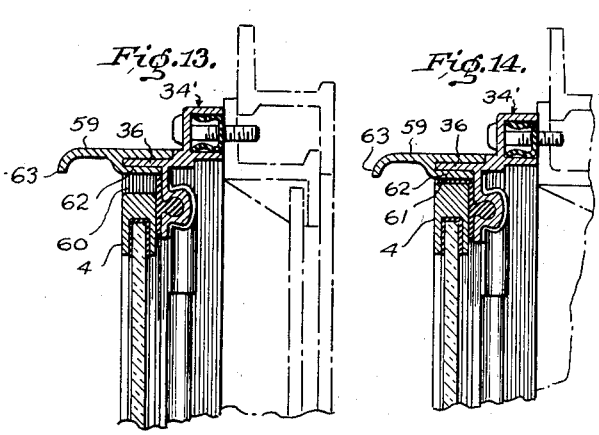
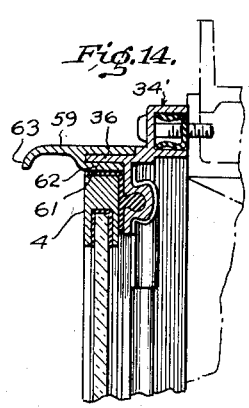
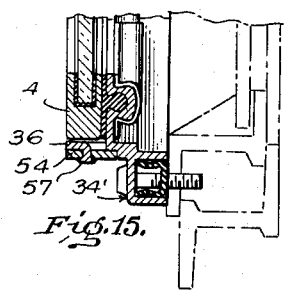
INVENTOR.
Harold A. Blood
BY Reginald W. Hoagland
ATTORNEY

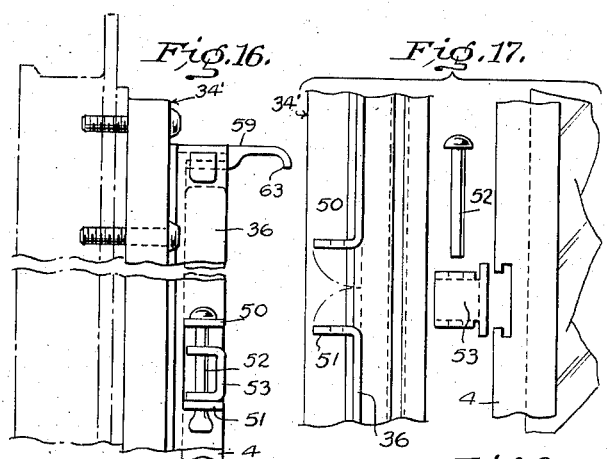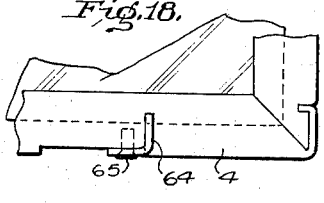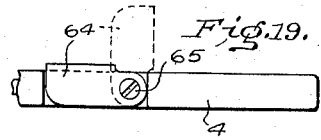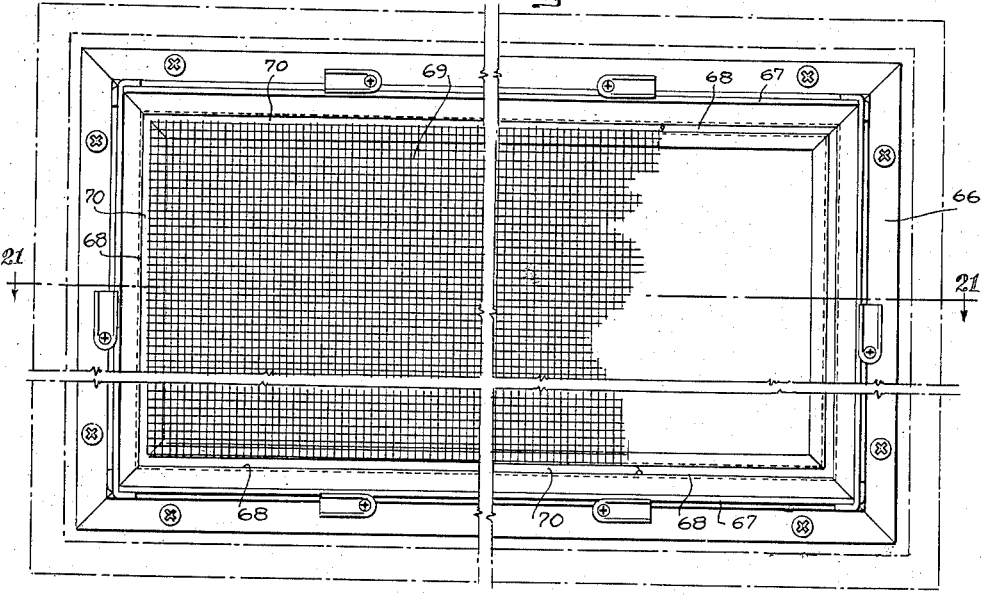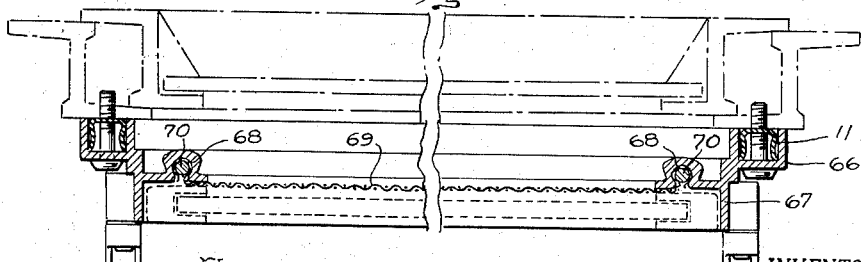

United States Patent Office 2,847,724
Patented Aug. 19, 1958

2,847,724

WINDOW CONSTRUCTION

Harold A. Blood, Holly, Mich.

Application January 21, 1953, Serial No. 332,298

2 Claims. (Cl. 20—11)

The invention relates to window construction and more particularly to auxiliary storm windows and screens attached exteriorly to casement windows.

The principal object of the invention is to provide an auxiliary metal window frame which may be readily secured to the outer side of either a permanent or a ventilator frame of a casement window and which supports a window sash that can be conveniently opened to gain access to adjacent surfaces of the glass panels of both the casement and auxiliary windows for cleaning purposes.

Another object of the invention is to provide an auxiliary metal window frame with the top, bottom, and sides thereof made from parts of identical cross section and each consisting of a pair of integral structural sections either of which may be cut, notched, or have portions thereof entirely cut away at areas different from that of the other section without weakening the strength of the other structural section, thereby permitting attachment and construction of other parts and avoiding interference with elements of the casement window.

Another object of the invention is to provide a construction which readily affords a seal at the point of attachment between the main and auxiliary window and/or the auxiliary sash and the auxiliary window.

Another object of the invention is to provide a novel method of corner construction whereby strong and readily assembled corners are readily obtainable.

A further object of the invention is to provide a type of construction which will allow a selection at the time of assembly as to whether the outer surface of the glass panel of the casement window will be readily accessible or more nearly inaccessible.

Still another object of the invention is to provide an auxiliary window frame construction wherein an assembly may be made consisting of a screen and a window sash, or a screen with a weatherstripped removable sash.

Still another object of the invention is to provide an auxiliary metal frame particularly adapted for the construction of a hinge bracket integral therewith.

Still other objects and advantages will be apparent during the course of the following description which taken in connection with the annexed drawings set forth in detail certain means of carrying out the invention, such disclosed means illustrating, however, but several of the various ways in which the principle of the invention may be used.

In the drawings:

Fig. 3 is a broken out sectional view showing one form of corner construction of the frame.

Fig. 4 is a sectional view taken along lines 4—4 of Fig. 3 looking in the direction of the arrows.

Fig. 5 is a sectional view showing the hinge which supports the window sash in the frame.

Fig. 6 is an exploded view showing the manner of forming the corners of the window sash.

Fig. 7 is a broken out sectional view similar to Fig. 3 showing however an embodiment wherein the frame is adapted to carry a sealing gasket or flexible weather strip adapted to seal the window sash to the window frame.

Fig. 8 is a plan sectional view of the embodiment of Fig. 7 showing the relation of the weatherstrip, frame, and sash.

Fig. 9 is a sectional view showing the reverse side of the embodiment of Fig. 7.

Fig. 10 is a detail view of the frame, weatherstrip, and latch mechanism provided for securing the sash against the frame.

Fig. 11 is another embodiment of the invention wherein the storm window sash can be opened in a novel manner.

Fig. 12 is an end view of the structure of Fig. 11.

Fig. 13 is an enlarged sectional view taken along lines 13—13 of Fig. 11 looking in the direction of the arrows.

Fig. 14 is a view similar to Fig. 13 showing a very slightly modified structure obtained by varying the relative size of parts at assembly.

Fig. 15 is an enlarged view taken along lines 15—15 of Fig. 12 looking in the direction of the arrows.

Fig. 16 is an enlarged sectional side elevation showing the construction of the hinge of the embodiment of Fig. 11.

Fig. 17 is an exploded view of the hinge showing the parts prior to assembly.

Fig. 18 is an enlarged view in side elevation showing the retractible handle utilized for opening the storm window.

Fig. 19 is a bottom view of the section shown in Fig. 18.

Fig. 20 is a further embodiment wherein the new window frame has been adapted to be secured to the outside of the permanent frame of a basement steel casement window and provides for a screened window.

Fig. 21 is a sectional view taken along lines 21—21 of Fig. 20 showing the details for attaching the screen to the frame and showing the removable window sash in dotted lines.

Fig. 22 is a fragmentary sectional view similar to Fig. 21 showing, however, a weatherstrip used to attach the screen and the basement storm window sash in place against the weatherstrip.

Figure 1:
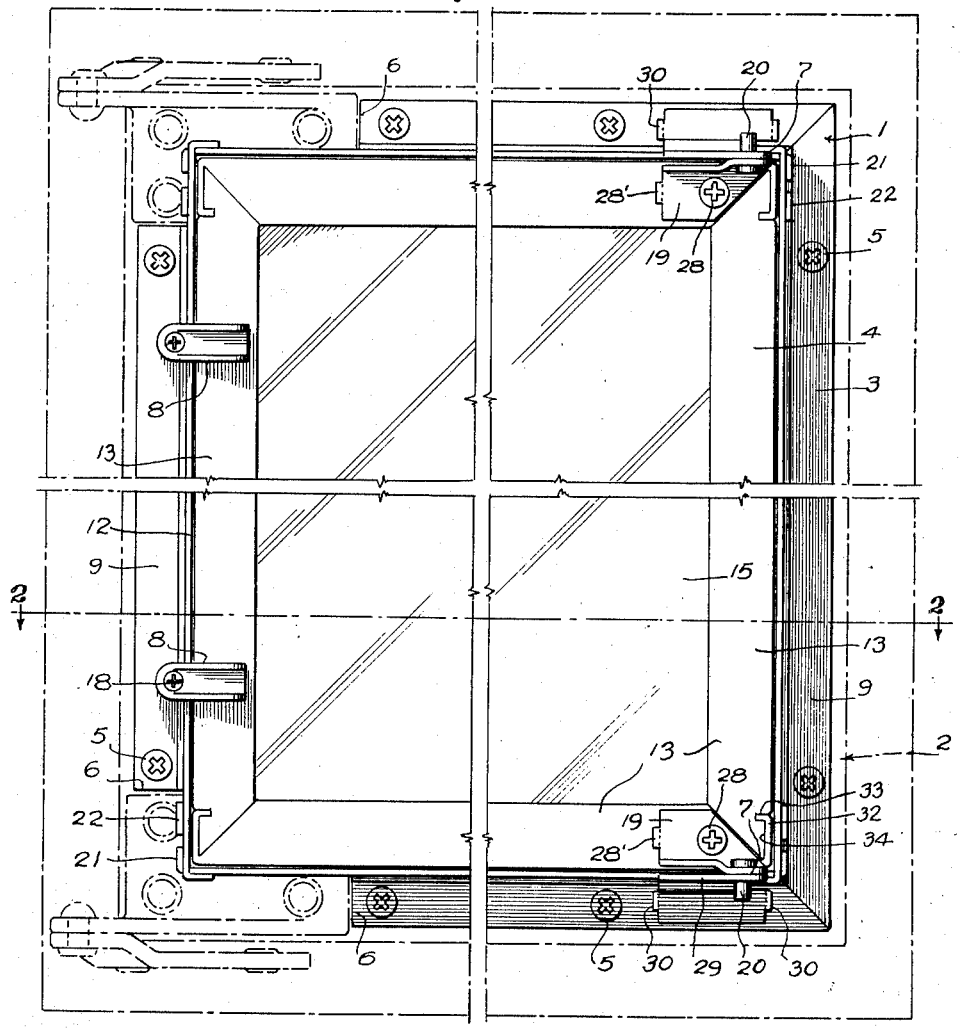
Fig. 1 is a side elevation of one embodiment of the invention.

Referring to Fig. 1 my new and improved storm window, indicated generally at 1, is fastened to the frame, in this instance, of a conventional hinged steel or aluminum ventilator section of a casement window shown in dash and dot lines and indicated at 2. It will be understood that the invention is equally applicable to those instances where permanent or non-openable type of casement window is encountered as well as those wherein one or more ventilator sections are adapted to be opened. The new window comprises a frame 3 and a sash 4. The frame 3 is attached to the conventional hinged frame as by means of self tapping screws 5 suitably spaced around the frame. A portion of the new frame is cut away at 6 to provide clearance for the hinges of the regular window without, however, being completely cut away all as will be described in greater detail later on in the specification. The sash 4 is hinged at 7 at the top and bottom and can be secured in the closed position as by means of rotating latch member 8 carried by the frame 3. It will be seen that the hinges 7 of the new auxiliary window is located on the opposite side of the window relative to the usual window hinges.

Figure 2:
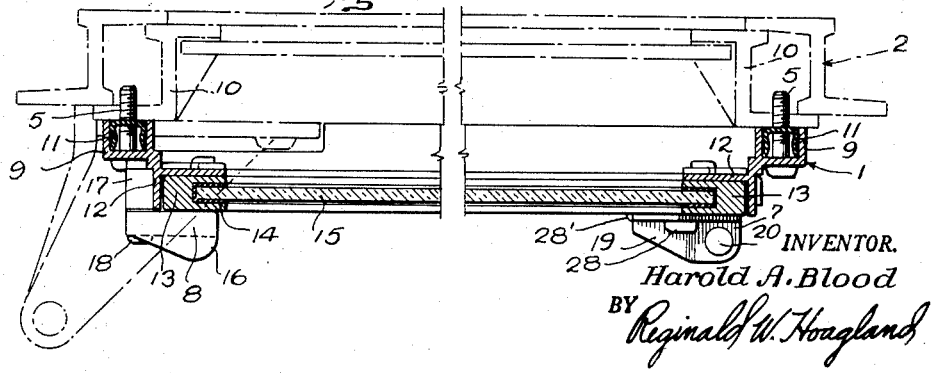
Fig. 2 is a sectional view taken along lines 2—2 of Fig. 1 looking in the direction of the arrows.

In the cross sectional view of Fig. 2 a double flanged section or channel element 9, which comprises a portion of my new frame member, is positioned with its legs abutting the modified Z-member frame element 10 comprising the conventional frame and indicated in dash and dot lines. Self tapping screws 5 extend through the web of the channel element 9 and hold it securely against the usual frame 10. A sealing element 11 U-shaped in cross section is positioned interiorly of the channel and serves to seal the channel portion of my new frame against the conventional frame. The sealing element can be any of those usually employed such as a molded rubber strip, rubberized fabric, plastic, or other compositions. The remaining portion of the frame element 3 comprises an angle section or an L-shaped portion 12 integral with and joined to the channel element 9 at a corner with one leg of the L parallel to the web of the channel and the other leg parallel to but displaced slightly inwardly to the inner leg or flange of channel member 9. The window sash 4 comprises the usual modified channel element 13 carrying a sealing strip 14 in which the glass 15 is secured. The sash 4 seats in the L-shaped portion 12 of the frame. A top view of catch or latch 8 shows it comprises a catch 16 rotatably secured in clip 17 by means of pin 18. Also shown in Fig. 2 is a top view of the sash hinge bracket 19 of hinge 7 together with hinge pin 20.

In the partially exploded view of Fig. 3 the corner construction of the frame is shown in detail. The corners are of miter construction with metal insert tabs 21, 22, and 23 adapted to engage slots 24, 25, and 26 as the joint is pressed together. The one leg of vertical L-shaped member 12 is depressed at 27 to accommodate the mating L-shaped leg from the top cross frame member. Once the joint is formed as indicated in the upper right hand corner of Fig. 3 the insert tabs 21, 22, and 23 are bent over to form a strong rigid corner. An additional tab member 27' which is formed from the end of the outstanding leg of L-shaped member 12 is adapted to be bent around the outstanding leg of the mating L-shaped section to provide further rigidity. The manner in which the frame is cut away to accommodate the regular casement window hinge is indicated at the upper left hand corner. The corner construction as well as the manner of providing the cut away portions have also been designed to permit the use of cutting and forming dies with the least number of operations for quickly and accurately shaping the ends of the frame members.

Fig. 4 indicates in dash and dot lines the channel portion 9 cut away to accommodate the regular window hinge while leaving the sash seating portion 12 of the frame intact.

In Fig. 5 the manner in which the hinge brackets are held in place and their shape is shown. L-shaped inner hinge bracket 19 carried by sash 4 is secured thereto by screw 28 and tab 28' as best shown in Fig. 1. Hinge pin 20 is fixedly secured to bracket 19 and rotates in bracket 29 which is secured to the frame by virtue of insert tabs 30 at either end engaging and being crimped in slots 31 in the frame element 4.

In Fig. 6 the detail of the corner construction of the window sash is seen to comprise an L-shaped hook element, formed from an extension 32 of the web portion of the channel shaped sash, adapted to be bent so that one leg of the L engages a complementary slot 33 in the web of an adjacent sash element 13. The web and legs forming the channel of the sash are cut away as indicated at 34 so that a flush surface is formed when the L-shaped hook 32 is bent down.

Figs. 7, 8, 9 and 10 show another embodiment of the invention wherein the L-shaped frame member 12 of Fig. 2 has been modified in shape to carry a sealing strip and additionally the corner construction is altered. The frame is generally indicated by the numeral 34' and has an outside channel member 35 integral with a modified L-shaped member 36. The leg of L-shaped member 36 projecting in a plane parallel to the plane of the window is grooved at 37 to provide a channel of generally circular cross-section with however a constricted opening into the inner face of the leg of the L-shaped member all as seen more clearly by reference to Fig. 8. The groove carries a molded rubber sealing strip 38 which is held in the channel by virtue of the constricted throat. The outside channel 35 carries the usual sealing strip 11 similar to that described in connection with Fig. 2. The window sash frame 39 carrying window 40 seats against the rubber strip 38. Hinge bracket 19 is secured in place by screw 28 and insert tab 28'. Latch 8 comprises catch 16, a clip 17, and pin 18. The clip 17 is secured to the upstanding leg of L-shaped member 36 by means of insert tabs 42 and 43 engaging slots 44 and 45 in the frame member 36 as seen in Fig. 7. Reference to Fig. 7 shows the corners to be mitered and an insert tab 46 on the cross frame member engages a slot 47 in the vertical frame member as the mitered joint is brought together. Bending the tabs 46 and 48 down helps to secure the corners and they are further secured by means of the grooved angle members 49 (Fig. 9) at each corner. The angle members 49 are made to be assembled over the outside and at the ends of the generally circular channel of the modified L-shaped member and are secured in place by closing in the same to snugly fit the outside contour of the grooved leg all as seen in Figs. 8 and 9. If desired the angle members 49 may be indented by a suitable tool at the point where the groove of the angle member registers or overlaps the groove 37 in the frame member 36. This further secures the corners of the frame firmly together.

A further embodiment of the invention is depicted in Figs. 11 through 19 inclusive. In this construction the frame is identical in construction with that of Figs. 7, 8, and 9 and is therefore indicated by numeral 34'. In the construction shown the auxiliary window is designed so that the sash may be opened and swung out by merely elevating and swinging the sash or be of a type held against opening by a removable element depending upon which mode of operation is desired at the time of assembly. This is mainly achieved by a novel hinge and latch arrangement. The hinges are made by cutting the outstanding leg of the L-shaped frame member 36 and bending a portion of the leg back to form hinge supports 50 and 51 (Figs. 11, 16, and 17) to provide supports for hinge pin 52. The web of the sash is slotted and recessed to accommodate hinge bracket 53 which may be suitably positioned and crimped in place. The bracket 53 is made narrower than the opening between bent back legs 50 and 51 whereby the window and sash may be moved vertically depending on the clearance provided when the latch members are installed. The latches comprise rectangular plates 54 provided with bayonet slots 55 which register with pins 56 carried by the sash. The latch members are positioned on the outstanding legs of the L-shaped frame member which is slotted adjacent the bayonet slot. Insert tabs 57 integral with but punched from the outstanding leg of the L-shaped frame member 36 register with elongated slotted openings 58 in the rectangular latch plates 54 whereby the location of the latch plate 54 is susceptible of adjustment vertically during assembly on location. A rain deflector or drip strip 59, seen more clearly in Figs. 13 and 14, fits over the outstanding leg of the L-shaped member 36 and serves as a stop for sash member 4 and the relative location of one to the other determines whether the window can be readily opened and swung out or whether it will be necessary to remove the deflector 59 to swing the sash outward. If desired the drip strip 59 may be provided for press fit assembly or it may be secured in place as by screws. For example if the sash is assembled to be of the readily swing-out type the latch plate 54 is located so that hinge bracket 53 rides on or near the lower hinge support 51. This then allows sufficient clearance between sash 4 and deflector 59 at 60 (Fig. 13) for the pins 56 to disengage the bayonet slots 55 when the sash 4 is raised vertically allowing sash 4 to swing out on the hinges. However if it is desired to assemble the auxiliary window so that the inner window is not so readily accessible the latch plates 54 are moved up by utilization of slotted opens 58 so that clearance between rain deflector 59 and sash 4 is insufficient to allow the pins 56 to clear when the sash is raised as is indicated in Fig. 14 at 61. The rain deflector 59 may suitably be an extruded form having a U-shaped portion 62 which fits over the outstanding leg of L-shaped member 36, and an outer downwardly curved end 63. As a means of lifting sash 4 when desired a partially concealed handle 64 rotating on pin 65 is recessed along the lower edge of sash 4, as seen in Figs. 11, 18, and 19.

In the embodiment of Figs. 20, 21, and 22 a fixed auxiliary frame is provided particularly for basement casement windows that may be used alternatively to give a screen window or a storm window depending on whether a screen or a screen and sash is inserted into the frame. In this embodiment the frame construction employs the outside channel member 66, usual sealing strip 11, and L-shaped member 67 carrying groove 68. When only a screened window is desired a screen 69 is placed in the frame and secured by pressing rod 70 and the edge section of the screen down into the neck of constricted groove 68 (see Fig. 21). The rod 70 will of course be selected to give a friction fit in the groove 68 on top of the screen whereby the latter is securely held in place. Alternatively if desired the assembly may be altered so that a window containing sash 71 (Fig. 22) may be employed over the screen and sealing strip 38 placed in groove 68 (Fig. 22) to tightly seal the storm window in place and hold screen 69 firmly. In this embodiment it will be apparent that the sealing strip 38 serves the functions of (1) a sealing strip and (2) an anchor or holding strip for the screen.

The constructional form above described and illustrated in the drawings is only to be regarded as an example, and its details may, of course, be modified in several ways without departing from the principle of the invention.

I claim:

1. A window frame for attachment of a window sash to a facing at a window opening, said frame comprising horizontal upper and lower rails and a pair of vertical side rails mitered at each end and arranged in a rectangular frame having mitered corners, said rails all having the same general cross section and each comprising a longitudinally extending channel section and a longitudinally extending L-shaped section displaced diagonally to one another and integrally connected longitudinally thereof at outer corners of the different sections, said L-shaped section having one of its right-angled walls parallel with and projecting in a direction opposite to the direction of projection of one of the spaced side walls of the channel section and having its other right-angled wall parallel with the intermediate connecting wall of said channel section and also projecting from said channel section, said rails being assembled with said last-mentioned walls of said L-shaped sections forming the inner peripheral edge of said frame and providing a seat against which a window sash may be positioned when inserted within the opening defined by the other and first-mentioned walls of said L-shaped sections, a longitudinally extending undercut bead on the side of the wall of each L-shaped section opposite to that against which the window sash seats, and corner brackets at the mitered ends of the side and end rails and overlapping the end portions of said beads and crimped into their undercut portions for frictional retention, said channel sections being positioned with the free edges of their spaced side walls directed toward the facing of the window opening, and sealing means carried by said channel sections and engaging the facing at the window opening.

2. A window frame as defined in claim 1 wherein the wall of each L-shaped section against which the window sash is seated is provided with a longitudinally extending weather stripping groove that opens on the face of said wall adjacent the sash and is of a depth within the longitudinally extending bead on the opposite face of said wall.

References Cited in the file of this patent

UNITED STATES PATENTS

| | | |
|---|---|---|
| 710,858 | Griesser | Oct. 7, 1902 |
| 2,180,415 | Herrmann | Nov. 21, 1939 |
| 2,278,666 | Peremi et al. | Apr. 7, 1942 |
| 2,395,673 | Krantz | Feb. 26, 1946 |
| 2,559,764 | Goldberg | July 10, 1951 |
| 2,578,470 | Gorell et al. | Dec. 11, 1951 |
| 2,612,662 | Pfaff | Oct. 7, 1952 |
| 2,640,232 | Price | June 2, 1953 |
| 2,651,084 | Goldberg | Sept. 8, 1953 |
| 2,667,245 | Shink | Jan. 26, 1954 |

FOREIGN PATENTS

| | | |
|---|---|---|
| 847,652 | Germany | Aug. 25, 1952 |